United States Patent [19]
Mangano et al.

[11] Patent Number: 5,918,471
[45] Date of Patent: Jul. 6, 1999

[54] JOULE-THOMSON CRYOSTAT IN-LINE VALVE FLOW CONTROLLER

[75] Inventors: Roy A. Mangano; Paul L. Buelow, both of Tucson, Ariz.

[73] Assignee: Raytheon Company, Lexington, Mass.

[21] Appl. No.: 08/975,836

[22] Filed: Nov. 21, 1997

[51] Int. Cl.$^6$ ..................................................... F25B 19/02
[52] U.S. Cl. ........................................... 62/51.2; 251/61.2
[58] Field of Search .............................. 62/51.2; 251/61.2

[56] References Cited

U.S. PATENT DOCUMENTS

| | | | |
|---|---|---|---|
| 5,003,783 | 4/1991 | Reale | 62/51.2 |
| 5,598,711 | 2/1997 | Stubbs | 62/51.2 |

*Primary Examiner*—Ronald Capossela
*Attorney, Agent, or Firm*—David W. Collins; Leonard A. Alkov; Glenn H. Lenzen, Jr.

[57] ABSTRACT

An in-line valve flow controller for a Joule-Thomson cryostat. The controller has an in-line valve stem that is part of, and is collinear with, an actuation stem of the cryostat. Both the in-line valve stem and actuation stem sit in an orifice of the Joule-Thomson cryostat. This arrangement automatically positions the valve stem over its valve seat. The in-line valve flow controller integrates with a temperature dependent snap disk that is used to close the valve stem against the valve seat. Initial flow rate is determined only by the diameter of the orifice of the Joule-Thomson cryostat, and not by valve position. Bypass flow is aso set by the diameter of the orifice, which is not subject wear, and the valve stem prevents contaminates from clogging the orifice.

3 Claims, 1 Drawing Sheet

JOULE-THOMSON CRYOSTAT IN-LINE VALVE FLOW CONTROLLER

BACKGROUND

The present invention relates generally to Joule-Thomson cryostats, and more particularly, to an in-line valve flow controller for a Joule-Thomson cryostat.

The assignee of the present invention manufactures missile systems that use a focal plane array infrared sensor that requires cooling to approximately 90° K. The temperature of the focal plane array and infrared sensor must be maintained within a few tenths of a degree Kelvin for precise target acquisition. Joule-Thomson coolers using argon or nitrogen gas are employed to cool the focal plane array infrared sensor.

Development of ultra fast cooldown cryostats by the assignee of the present invention has lead to a need for an actuator/flow controller that is compatible therewith. The flow controller is required to permit high flow during cooldown, and reduce flow once cooldown temperature is reached, while permitting a low flow to maintain the temperature of the focal plane array infrared sensor.

The Joule-Thomson valve flow controller currently used by the assignee of the present invention incorporates a needle as the valve stem. The needle is positioned off axis from the actuator stem, and therefore requires precise radial positioning to function. When the valve is open, the needle sits above the Joule-Thomson orifice. When actuated to close, the needle is draw into the orifice opening, blocking flow. Initial needle position and orifice condition dictate the open flow rate.

The needle must be positioned with great accuracy, with reliability and repeatability subject to the tolerances provided in manufacturing. The orifice opening is only about 0.006 inches in diameter, which is difficult to machine, and has been known to clog due to either contamination or wear from repeated usage. Bypass flow is accomplished through longitudinal scribe lines in the orifice seat, which in turn allows a small amount of flow past the needle. At best, this bypass flow arrangement is poorly repeatable owing to the difficulty in repeatably scribing a fine line in the seat. Also, after prolonged use, the scribe lines wear, and little or no bypass flow is obtained.

Accordingly, it is an objective of the present invention to provide for an improved Joule-Thomson cryostat valve flow controller.

SUMMARY OF THE INVENTION

To meet the above and other objectives, the present invention provides for an in-line valve flow controller for a Joule-Thomson cryostat that has an in-line valve stem that is part of (and is collinear with) the actuation stem of the cryostat. Both the in-line valve stem and actuation stem are part of (sit in) an orifice of the Joule-Thomson cryostat. This arrangement automatically positions the valve stem over the valve seat. The in-line valve flow controller integrates with a temperature dependent snap disk design developed by the assignee of the present invention that is used to close the valve stem against the valve seat. Initial flow rate is determined only by the diameter of the orifice of the Joule-Thomson cryostat, and not by valve position. Bypass flow is also set by the diameter of the orifice, which is not subject wear. The stem prevents contaminates from clogging the orifice opening (gap). Thus, the valve design is not prone to the wear or clogging problems which are inherent in other designs.

Various missiles currently produced by the assignee of the present invention that would benefit from using the present invention are those that require ultra fast cooldown of a focal plane array infrared sensor in a time frame of from 3 to 10 seconds. However, it is to be understood that the in-line valve flow controller may be used with any Joule-Thomson cryostat, whether it requires fast cooldown or not.

BRIEF DESCRIPTION OF THE DRAWINGS

The various features and advantages of the present invention may be more readily understood with reference to the following detailed description taken in conjunction with the accompanying drawings, wherein like reference numerals represent like structural elements, and in which.

DETAILED DESCRIPTION

Figure 1:
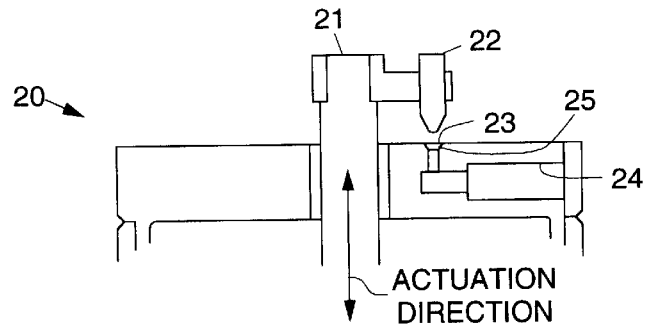
FIG. 1 illustrates a prior art Joule-Thomson valve flow controller that is improved upon by the present invention.

Referring to the drawing figures, FIG. 1 illustrates a prior art Joule-Thomson valve flow controller 20 that is improved upon by the present invention. The prior art Joule-Thomson valve flow controller 20 heretofore used by t he assignee of the present invention incorporates a needle 22 as a valve stem. The needle 22 is positioned off axis from an actuator stem 21 of the Joule-Thomson cryostat (not shown), and therefore requires precise radial positioning to function. When the valve flow controller 20 is open, the needle 22 sits above a valve orifice 23 of the Joule-Thomson cryostat. When actuated to close, the needle 22 is draw into the orifice 23, blocking flow from a high pressure inlet 24. The initial position of the needle 22 and condition of the orifice 23 dictate the flow rate when the valve flow controller 20 is open. The needle 22 must be positioned with great accuracy, with reliability and repeatability subject to the tolerances provided in manufacturing. The orifice 23 is only about 0.006 inches in diameter, which is difficult to machine, and has been known to clog due to either contamination or wear from repeated usage. Bypass flow is accomplished by way of longitudinal scribe lines (not shown) in the orifice seat 25, which in turn allows a small amount of flow past the needle 22. At best, this bypass flow arrangement is poorly repeatable because of the difficulty in repeatably machining the fine scribe lines in the seat 25. Also, after prolonged use, the scribe lines wear, and little or no bypass flow is obtained.

Figure 2:
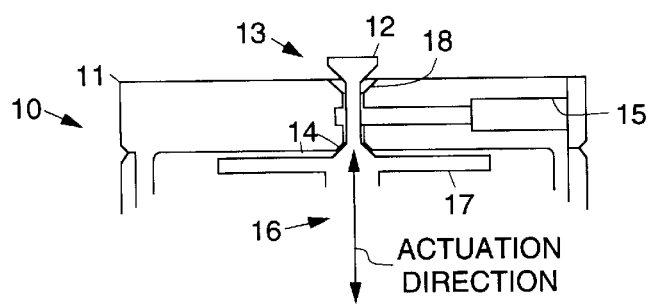
FIG. 2 is a cross sectional view illustrating the design of an in-line valve in accordance with the principles of the present invention for use with a Joule-Thomson cryostat.
Figure 3:
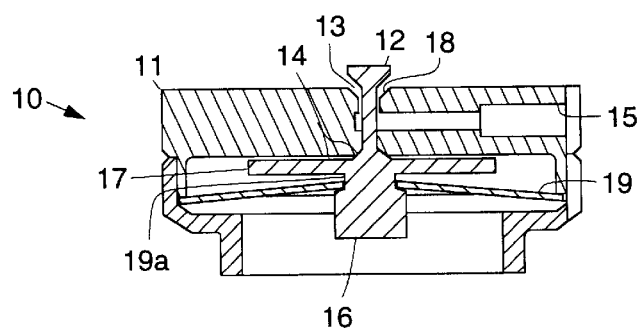
FIG. 3 illustrates a cross sectional view of a complete Joule-Thomson cryostat in-line valve flow controller in accordance with the principles of the present invention.
Figure 4:
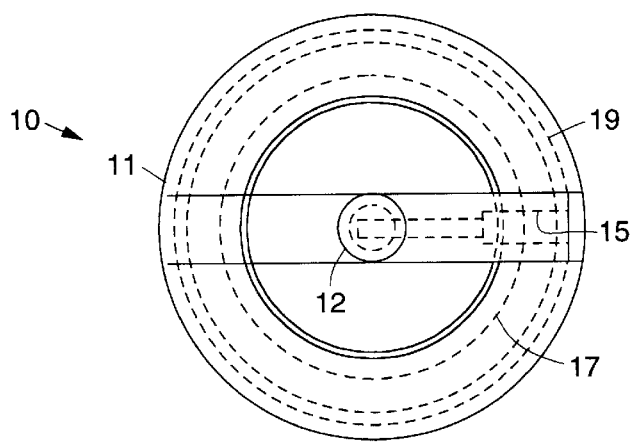
FIG. 4 illustrates a top view of the in-line valve flow controller of FIG. 3.

The present invention is designed to overcome the limitations of the prior art valve flow controller 20 shown in FIG. 1. FIG. 2 is a cross sectional view illustrating the design of an in-line valve flow controller 10 in accordance with the principles of the present invention for use with a Joule-Thomson cryostat and that improves upon the controller 20 shown in FIG. 1. FIG. 3 illustrates a cross sectional view of a complete Joule-Thomson cryostat in-line valve flow controller 10. FIG. 4 illustrates a top view of the in-line valve flow controller 10 of FIG. 3.

The in-line valve flow controller I O is comprised of a housing 11 or body 11 having a high pressure gas inlet 15 that is coupled to a central main flow path 13 comprising a Joule-Thomson orifice 13. An actuation stem 16 is disposed in the main flow path 13. A valve stem 12 forms an integral part of the actuation stem 16 and is formed at an upper end of the actuation stem 16 and mates with a flared valve seat 18 formed in the upper end of the body 11 when the valve 10 is closed.

A bottom portion of the main flow path 13 is flared to form a bypass flow path 14. A bypass flow deflector 17 seats in the flared portion of the bypass flow path 14 and is integral with the actuation stem 16 and valve stem 12. The bypass flow deflector 17 is a disk that has a diameter substantially larger than the diameter of the main flow path 13. A groove 19*a* is formed in a the actuation stem 16 below the bypass flow deflector 17 into which a snap disk 19 is disposed. The snap disk 19 is a washer-like disk that has a cone shape and extends from the groove 19*a* to the wall of the housing 11. The snap disk 19 is used to close the valve stem against the valve seat.

In the present invention, the valve stem 12 is part of the actuation stem 16, and both are part of (sit in) the Joule-Thomson orifice 13. This automatically positions the valve stem 16 over the valve seat 18, as is shown in FIG. 3, for example. Because the valve stem 12 and the actuation stem 16 are both positioned in the Joule-Thomson orifice 13, the likelihood of clogging from particulate contamination is reduced.

Initial flow rate is determined by the diameter of the Joule-Thomson orifice 13, and not by the position of the valve stem 16 relative to the valve seat 18. Presented below are calculations pertaining to flow rates for the valve flow controller 10. The first calculations shown are for a 0.006" diameter orifice 13. The flow rate is calculated based on pressure, temperature, gas (Argon), and diameter of the Joule-Thomson orifice 13. For these inputs, a volumetric flow rate of 51 standard liters per minute (SLM) was determined, which agrees with experimental results.

Following this computation, the flow rate through an annular gap (the Joule-Thomson orifice 13) is calculated. Using the same inputs, but varying diameter and gap area, an equivalent flow rate was determined. For a flow rate similar to that of the Joule-Thomson orifice 13 alone, an orifice diameter of 0.0175" with a valve stem diameter of 0.015" is used. Both dimensions are easily machinable. The bypass flow path has a 0.016" diameter orifice 13, and the dimension of the valve stem 13 is substantially the same.

Calculation of choked orifice flow through a diameter Joule-Thomson valve. The gas is Argon. In the following calculation, $\gamma$ is ratio of specific heat $(C_p/C_v)$, $P_0$ is the upstream stagnation pressure, $T_0$ is stagnation temperature $R_{ar}$ is universal gas constant, d is diameter, A is area, $C_d$ is discharge coefficient of the orifice 13, is mass flow rate, rho is the gas density, and Q is the volumetric flow rate.

Assume that, $\gamma$=2.314
Po=6000 psia=4.14 E+07 Pa
To=70.0° F.=294.3° K.
Rar=208 J/kg° K.
d=0.006"
A=2.83E−05 in$^2$=1.32 E−08 m$^2$
Cd=0.62

Therefore, $$\dot{m} = (Po*(Cd*A)\sqrt{To})*\sqrt{\gamma/Rar} *$$

$$\sqrt{2/\gamma+1}\;^\wedge(\gamma+1)/(\gamma-1)1.52\,E-03\,\text{kg/s},$$

Thus, rho at standard temperature and pressure (STP) is rho (@STP)=0.045 moles/l. Argon has a specific mass=39.950 gm/mole. Therefore, the flow rate rho=1.798 gm/l, and Q=/rho=50.8 l/min.

In the second calculation. Pe corresponds to external (ambient) pressure, del(P) is the pressure difference between $P_0$ and $P_e$, $A_{ann}$ is the area of the annulus, $D_{stm}$ is the diameter of the stem, $L_{stm}$ is the length of the stem, and Visc is gas viscosity.

For flow through a thin annular gap (the bypass flow path 14), assume that,

Po=6000 psia
Pe=Po*((2/($\gamma$+1))A($\gamma$/($\gamma$−1)))=2466 psia
del(P)=3534 psia
To=70 F
Aann=1.1 3E−04 in$^2$
Dstm=0.015"
Lstm=0.012"
The gap of the main flow path 13=0.0012"
The gap of the bypass flow path 14=0.006"
Visc=2.96E−05 lbm/ft s=9.20E−07 lbf s/ft$^2$.

Therefore,

Q=(del(P)*(Gap$^3$)*Dstm*$^1$)/(12*Visc*Lstm).

Thus, Q=1.94E+00 ft$_3$/s for the main flow path 13, and Q=2.72E−01 ft$^3$/s for the bypass flow path 14.

Thus, an improved Joule-Thomson cryostat valve flow controller has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An in-line valve flow controller comprising:
   a housing having a high pressure gas inlet that is coupled to a central main flow path comprising a Joule-Thomson orifice;
   an actuation stem disposed in a lower portion of the main flow path;
   a valve stem formed at an upper end of the actuation stem;
   a flared valve seat formed at an upper end of the housing that mates with the valve stem when the valve is closed;
   a flared bypass flow path formed at a bottom portion of the main flow path; and
   a bypass flow deflector seats in the flared bypass flow path and is integral with the actuation stem.

2. The controller of claim 1 wherein the bypass flow deflector comprises a disk that has a diameter that is larger than the diameter of the main flow path.

3. The controller of claim 1 further comprising:
   a groove formed in a the actuation stem below the bypass flow deflector; and
   a snap disk disposed in the groove that has a cone shape and extends from the groove to the wall of the housing.

* * * * *

UNITED STATES PATENT AND TRADEMARK OFFICE
CERTIFICATE OF CORRECTION

PATENT NO. : 5,918,471
DATED : July 6, 1999
INVENTOR(S) : Roy A. Mangano and Paul L. Buelow It is certified that error appears in the above-identified patent and that said Letters Patent is hereby corrected as shown below:

Column 3,
Line 66, the equation should read:
-- $A = 2.83E\text{-}05 \text{ in}^2 = 1.82 E\text{-}08 \text{ m}^2$ --

Column 4,
Line 5, the equation should read:
-- $\sqrt{2/\gamma+1}^{(\gamma-1)} = 1.52E\text{-}03 \text{ kg/s}$, --
Line 30, the equation should read:
-- $Q = (del(P) * (Gap^3) * Dstm * \Pi)(12 * Visc * Lstm)$. --

Signed and Sealed this

Eighteenth Day of March, 2003

JAMES E. ROGAN
*Director of the United States Patent and Trademark Office*